(12) United States Patent
Kim

(10) Patent No.: US 8,342,520 B2
(45) Date of Patent: Jan. 1, 2013

(54) MEDIUM REGISTRATION APPARATUS AND IMAGE FORMING APPARATUS INCLUDING THE SAME

(75) Inventor: Jun-tae Kim, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 1616 days.

(21) Appl. No.: 11/755,287

(22) Filed: May 30, 2007

(65) Prior Publication Data

US 2008/0094670 A1   Apr. 24, 2008

(30) Foreign Application Priority Data

Oct. 23, 2006   (KR) .................. 10-2006-0103113

(51) Int. Cl.
*B65H 9/16* (2006.01)
(52) U.S. Cl. ......... 271/249; 271/251; 271/252; 271/253
(58) Field of Classification Search .................. 271/240, 271/248–254
See application file for complete search history.

(56) References Cited

U.S. PATENT DOCUMENTS

| 5,172,138 A * | 12/1992 | Okazawa et al. ............. 346/134 |
| 6,870,561 B2 * | 3/2005 | Yamada ........................ 347/262 |
| 7,571,908 B2 * | 8/2009 | Inui et al. ...................... 271/251 |
| 2006/0170149 A1 * | 8/2006 | Seto .............................. 271/240 |

FOREIGN PATENT DOCUMENTS

| JP | 63-127955 | 5/1988 |
| JP | 7-330226 | 12/1995 |
| JP | 8-143233 | 6/1996 |
| KR | 2001-0000258 | 1/2001 |

* cited by examiner

*Primary Examiner* — Michael McCullough
(74) *Attorney, Agent, or Firm* — Staas & Halsey LLP

(57) ABSTRACT

A medium registration apparatus for an image forming apparatus. The registration apparatus includes: a subassembly including a first guide plate that guides a medium along a medium transferring direction, and a side guide disposed adjacent to one side of the first guide plate, in parallel with the medium transferring direction and is a side registration reference; a subassembly moving guide that supports the subassembly, so that the subassembly can move in a direction crossing the medium transferring direction; and a subassembly driver that drives the subassembly. The image forming apparatus includes: the registration apparatus; an image forming part; a reverse roller that reverses a transferring direction of a medium printed on by the image forming part.

28 Claims, 19 Drawing Sheets

MEDIUM REGISTRATION APPARATUS AND IMAGE FORMING APPARATUS INCLUDING THE SAME

CROSS-REFERENCE TO RELATED APPLICATION

This application claims the benefit of Korean Application No. 2006-103113, filed Oct. 23, 2006, in the Korean Intellectual Property Office, the disclosure of which is incorporated herein by reference.

BACKGROUND OF THE INVENTION

1. Field of the Invention

Aspects of the present invention relate to a medium registration apparatus and an image forming apparatus including the same.

2. Description of the Related Art

In an image forming apparatus, it is important to register (align) inclined or misaligned printing medium, to form an image on a predetermined area of the printing medium.

Medium registration apparatuses may be classified as a center registration apparatus and as a side registration apparatus. As shown in FIG. 1, in a common center registration type, a leading edge T, of an askew piece of medium P, for example a piece of paper, is bumped to rollers R disposed on a rotating shaft X. The shaft is transversely disposed with respect to a medium transferring direction A, to thereby register the medium P.

As shown in FIG. 2, in a side registration apparatus, a guide G is disposed parallel to the medium transferring direction A. The askew medium P is moved in a direction B towards the guide G, and a side S of the medium P is bumped to the guide G, to thereby register the medium.

As shown in FIG. 3, a conventional double-sided image forming apparatus 1 comprises a single-sided printing path (SP) and a double-sided printing path (DP). Disposed on the single-sided printing path SP are a pick up roller 2, a registration roller 3, a photosensitive drum 4, a transfer roller 5, and a fixing device 6. The medium passing through the single-sided printing path S is aligned with a center registration, registration roller 3.

A reverse roller 7 is rotated in a reverse direction to move a single-side printed medium to the double-sided printing path (DP), in order to print on a second side of the medium. A side registration medium registration apparatus 10 is installed in the double-sided printing path (DP). The medium registration apparatus 10 comprises a first guide plate 11 that guides the single-sided printed medium toward the double-sided printing path (DP), and a second guide plate 13 that faces the first guide plate 11. A space, separating the first guide plate 11 and the second guide plate 13, forms a path through which the medium is transferred during the double-sided printing process.

As shown in FIG. 6, idle rollers 12 are disposed on one side of the first guide plate 11 to move an askew medium toward a side guide 15.

As shown in FIGS. 4 and 5, the second guide plate 13 comprises a side guide 15 that functions as a side registration reference line L for medium. Also, as shown in FIG. 4, on a side edge of the second guide plate 13 duplex rollers 14 are provided, which transfer medium to the single-side transferring roller 8, along the double-sided printing path DP. The duplex rollers 14 are provided in opposition to the side guide 15, to rotate the idle rollers 12. In general, rotating shafts 12a of the idle rollers 12 are offset at an angle of about 6°, with respect to rotating shafts 14a of the duplex rollers 14.

A medium that enters the double-side printing path DP is transferred in a skewed direction with respect to the medium transferring direction (see A in FIG. 4), by the duplex rollers 14 and the idle rollers 12, and one side of the medium is bumped to the side guide 15, to be side registered. The registered medium reenters the single-sided printing path SP, due to the rotation of the single-side printing transfer roller 8.

The medium registration apparatus 10 has shorter shafts and needs fewer components than a center registration apparatus, has a lower cost, and does not require rotating shafts disposed across the entire medium.

The medium registration apparatus 10 is usually set to be suitable for A4 size medium (210×297 mm). However, if a user wants to double sided print on A5 size medium (148×210 mm) or B5 size medium (182×257 mm), it is impossible to side register. As shown in FIG. 4, since a large gap W is between the side S1 of the A5 medium and the side guide 15, the side S1, of the A5 medium is not bumped to the side guide 15, even if the A5 medium passes through the double-sided printing path DP that is set for the A4 medium.

If the double-sided printing path DP is made longer, so that the side S1 of the A5 medium can be bumped to the side guide 15, the size of an image forming apparatus must be increased, thereby decreasing the space efficiency of the imaging forming apparatus.

SUMMARY OF THE INVENTION

Accordingly, it is an aspect of the present invention to provide a medium registration apparatus, for an image forming apparatus that side registers small-sized medium, such as, A5 or B5 medium, and has good internal space efficiency.

Additional aspects of the present invention will be set forth in part in the description which follows and, in part, will be obvious from the description, or may be learned by practice of the present invention.

The foregoing and/or other aspects of the present invention can be achieved by providing an image forming apparatus, comprising: an image forming part; a reverse roller that reverses a medium transferring direction of medium printed on by the image forming part; a first guide plate that supports one side of the printed medium and guides the printed medium to the image forming part; a subassembly comprising a side guide that extends from one surface of the first guide plate, along the medium transferring direction, and is a side registration reference for the printed medium; a subassembly moving guide part that supports the subassembly so that the subassembly can move in a direction at an angle to the medium transferring direction; and a subassembly driving part (subassembly driver) that drives the subassembly.

According to an aspect of the invention, the subassembly moves rectilinearly in a direction generally perpendicular to the medium transferring direction. According to another aspect of the invention, the side guide is integrated with the first guide plate.

According to an aspect of the invention, the image forming apparatus further comprises: a medium size sensor part (paper size sensor) that senses the size of the printing medium; and a controller that moves the subassembly so that the side guide can be disposed to a side registration reference position corresponding to the sensed medium size.

According to an aspect of the invention, the image forming apparatus further comprises: a second guide plate that faces the first guide plate; and an askew medium mover, which is provided in at least one of the first guide plate and the second guide plate, and transfers the printing medium toward the side guide at an offset direction, with respect to the medium transferring direction.

According to an aspect of the invention, the second guide plate is coupled to the first guide plate and moves integrally with the subassembly.

According to an aspect of the invention, the image forming apparatus further comprises: a medium size sensor part that senses the size of the printing medium; and a controller that controls the subassembly driving part, so that the side guide can be disposed to a side registration reference position, corresponding to the medium size sensed by the medium size sensor part.

According to an aspect of the invention, the image forming apparatus further comprises a frame that is installed therein. The subassembly moving guide part comprises: a moving guide member, which is provided in at least one of the first guide plate and the frame, and guides the rectilinear movement of the subassembly; and a moving guide supporting member, which is provided in one of the first guide plate and the frame, and rotatably supports the subassembly in connection with the moving guide member.

According to an aspect of the invention, the moving guide member includes a round shaft member that extends along the direction of rectilinear movement of the subassembly. The moving guide supporting member includes a ring member that encloses a rounded surface of the moving guide member along an axis of the moving guide member.

According to an aspect of the invention, the subassembly driving part comprises a driving motor; a pulley that has an axis of rotation parallel to an axis of rotation of the driving motor; a belt that connects the pulley with the axis of rotation of the driving motor; and a clamper attached to the first guide plate and which clamps the belt.

According to an aspect of the invention, the subassembly driving part comprises a driving motor; a pinion that is rotated by the driving motor; and a rack, which is provided in the first guide plate, and enables the subassembly to move rectilinearly in engagement with the pinion.

The foregoing and/or other aspects of the present invention can be achieved by providing a medium registration apparatus comprising: a subassembly comprising a first guide plate that supports one side of the printing medium and aligns the printing medium with a predetermined medium transferring direction, and a side guide, which extends from one surface of the first guide plate along the transferring direction, and becomes a side registration reference for the printed papers; a subassembly moving guide part that supports the subassembly so that the subassembly can move in a direction crossing the medium transferring direction; and a subassembly driving part that drives the subassembly.

According to an aspect of the invention, the subassembly moves rectilinearly in a direction perpendicular to the medium transferring direction, and the side guide is integrated with the first guide plate.

According to an aspect of the invention, the medium registration apparatus further comprises: a second guide plate that overlaps the first guide plate; and a medium mover, which is provided in at least one of the first guide plate and the second guide plate, and moves the printing medium to the side guide. The second guide plate can be coupled to the first guide plate and can move integrally with the subassembly.

According to an aspect of the invention, the medium registration apparatus, of the image forming apparatus, further comprises: a medium size sensor part that senses the size of the printing medium; and a controller to control the subassembly driving part, so that the side guide can be disposed to a side registration reference position, corresponding to the medium size sensed by the medium size sensor part.

According to an aspect of the invention, the medium registration apparatus further comprises a frame. The subassembly moving guide part comprises a moving guide member that is provided in at least one of the first guide plate and the frame. The subassembly moving guide part guides the rectilinear movement of the subassembly, and a moving guide supporting member, which is provided in the other of the first guide plate and the frame, rotatably supports the subassembly in connection with the moving guide member.

According to an aspect of the invention, the moving guide member includes a rounded shaft member that extends along the rectilinear movement direction of the subassembly. The moving guide supporting member includes a ring member that covers a rounded surface of the moving guide member along an axis of the moving guide member.

According to an aspect of the invention, the subassembly driving part comprises a driving motor; a pulley that rotates along an axis parallel with a rotational axis of the driving motor; a belt that connects the pulley with the axis of the driving motor; and a clamper that is attached to the first guide plate and clamps the belt.

According to an aspect of the invention, the subassembly driving part comprises a driving motor; a pinion that is rotated by the driving motor; and a rack attached to the first guide plate, which enables the subassembly to move rectilinearly in engagement with the pinion.

Additional aspects and/or advantages of the invention will be set forth in part in the description that follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
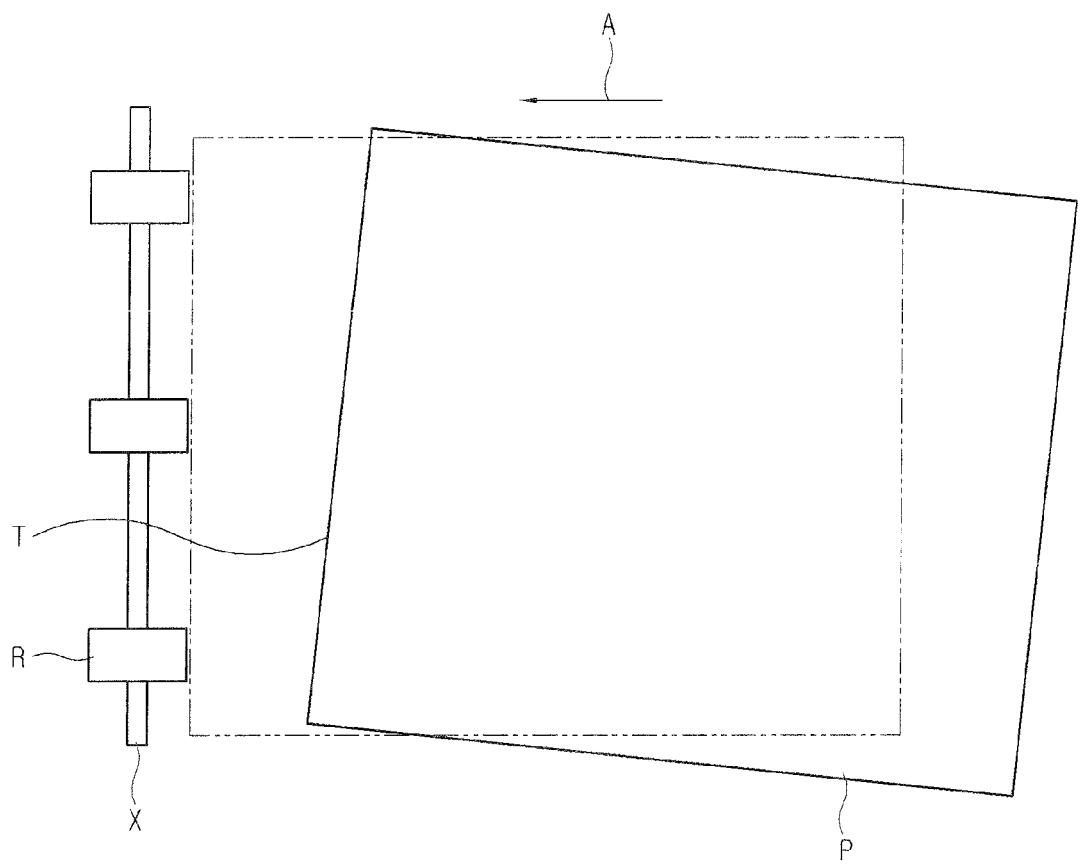
FIG. 1 is a schematic view illustrating a conventional center registration type medium registration device.
Figure 2:
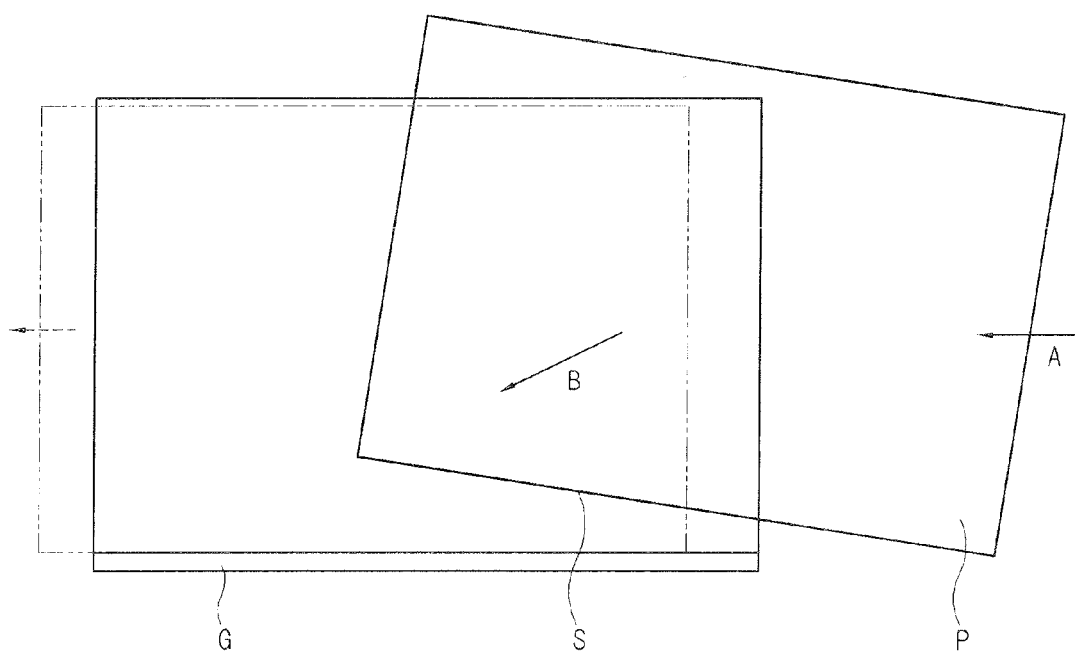
FIG. 2 is a schematic view illustrating a conventional side registration type medium registration device.
Figure 3:
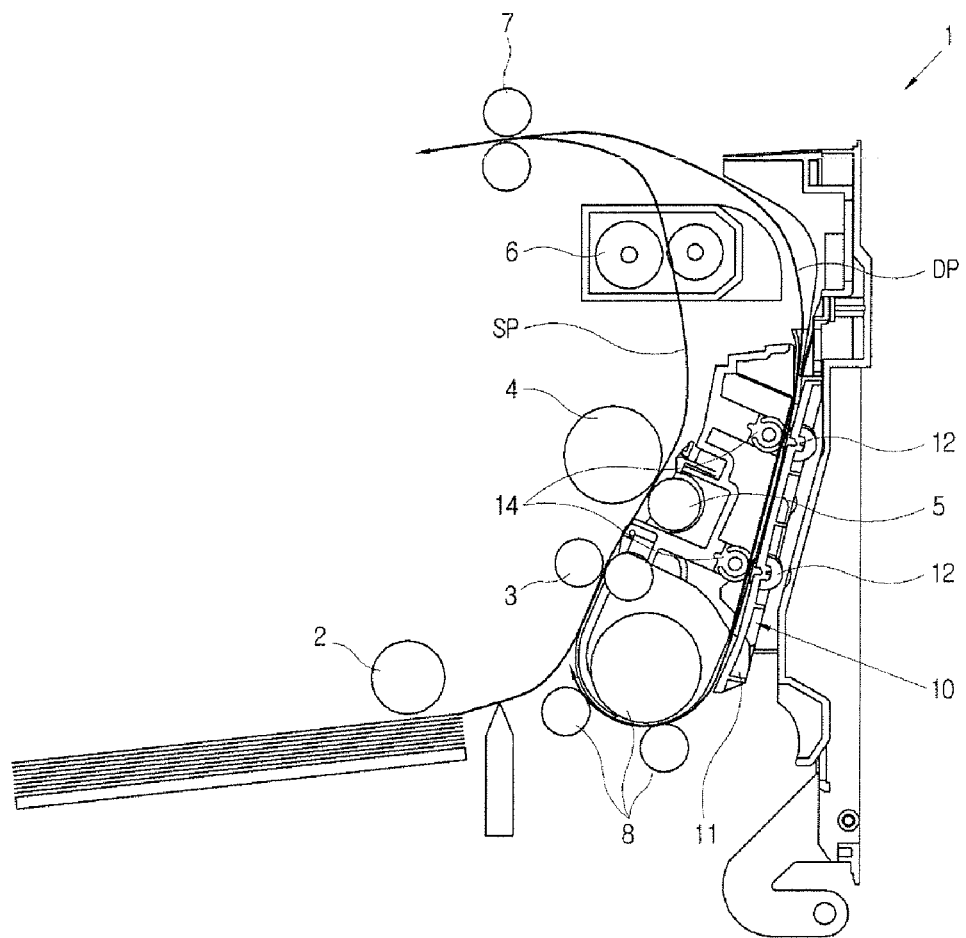
FIG. 3 is a schematic side sectional view of a conventional image forming apparatus.
Figure 4:
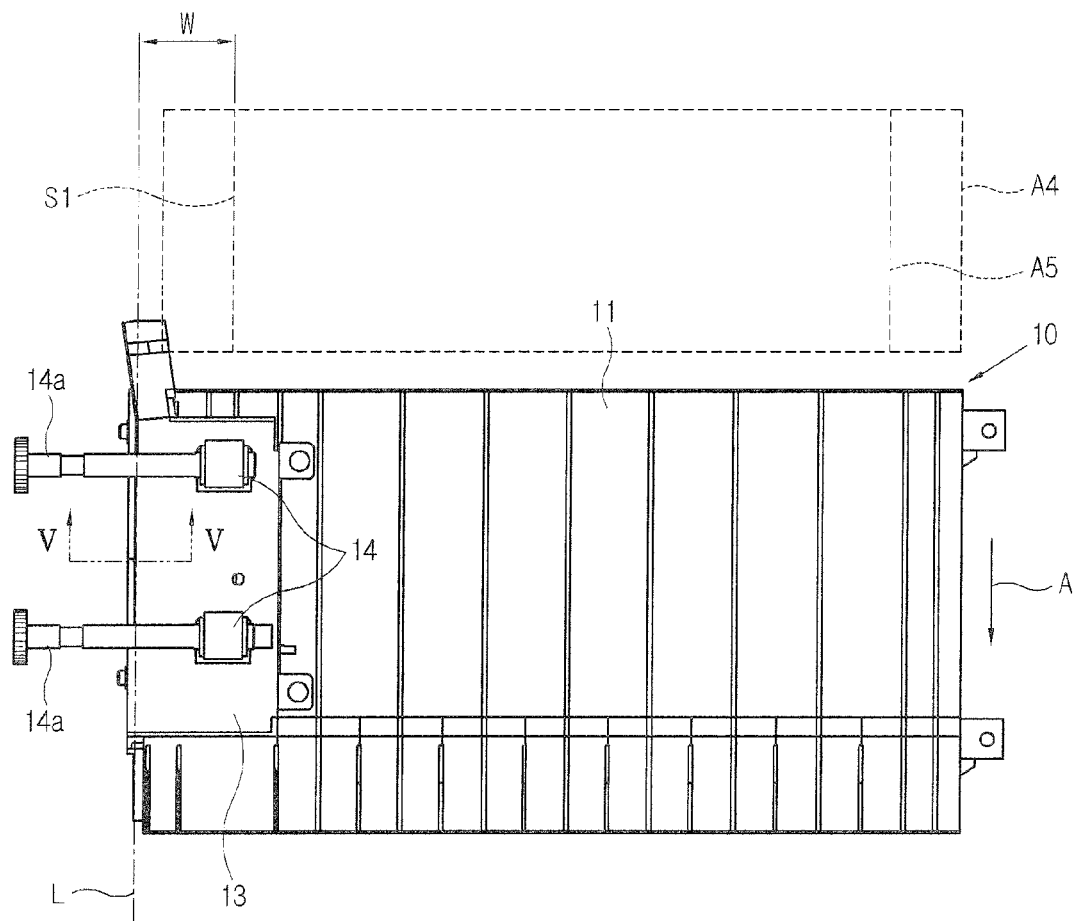
FIG. 4 is a plan view of a medium registration apparatus of the image forming apparatus of FIG. 3.
Figure 5:
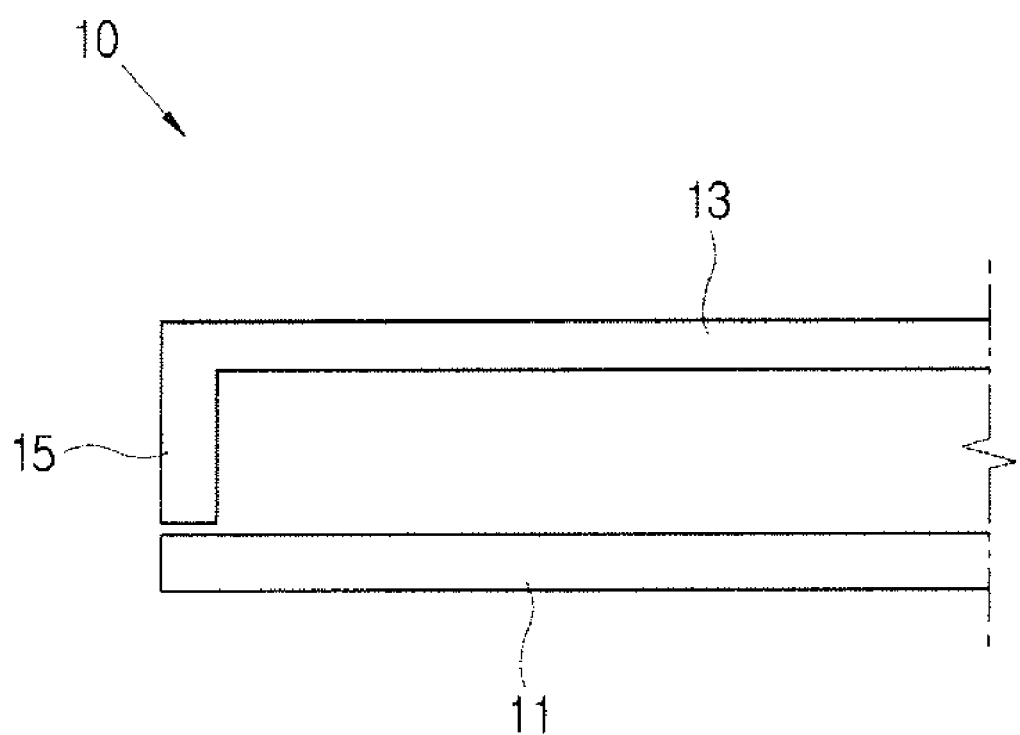
FIG. 5 is a sectional view according to a line V-V of FIG. 4.
Figure 6:
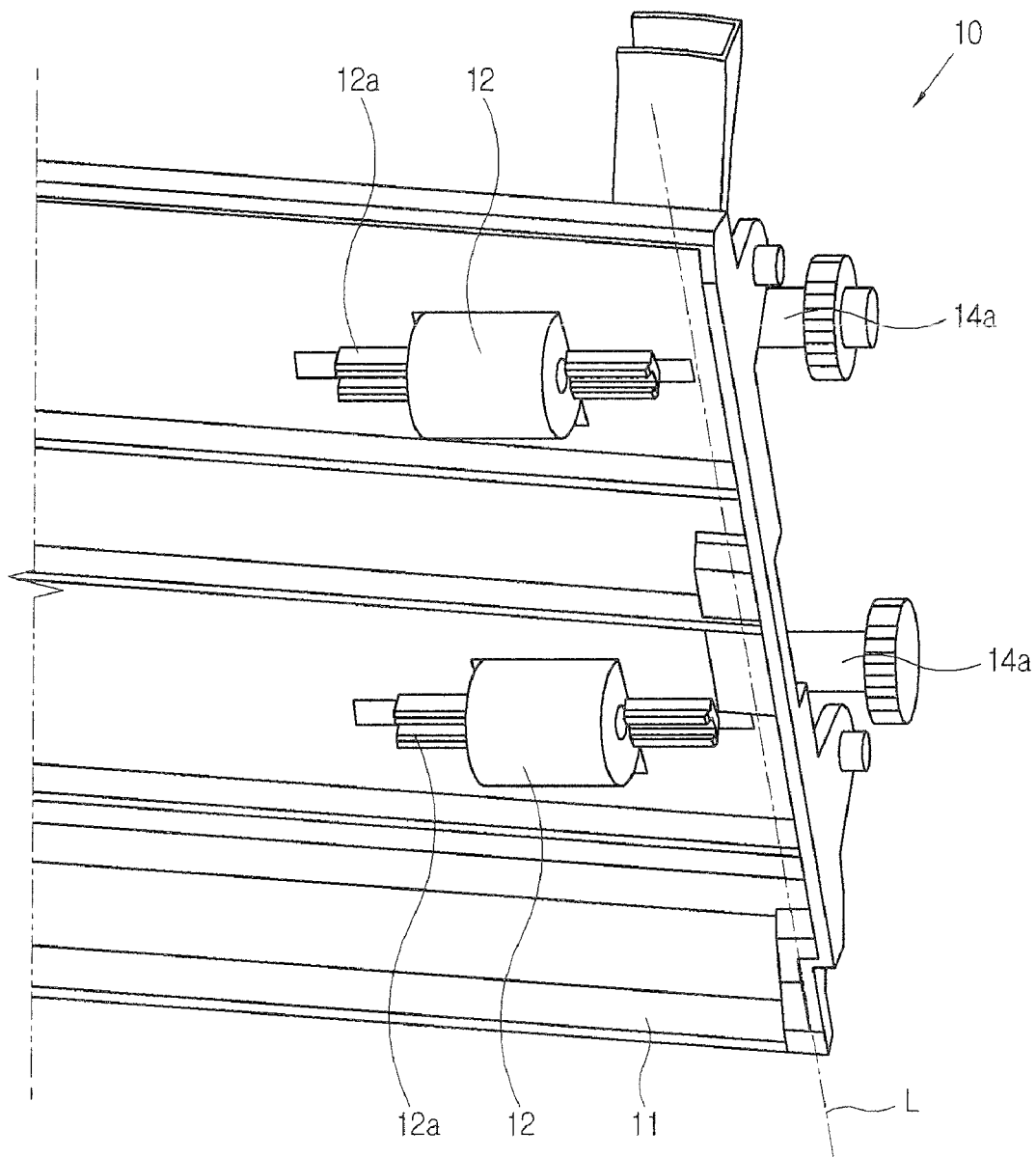
FIG. 6 is a rear perspective view of the medium registration apparatus of the image forming apparatus of FIG. 3.

Reference will now be made in detail to aspects of the embodiments of the present invention, examples of which are illustrated in the accompanying drawings, wherein like reference numerals refer to like elements throughout. The embodiments are described below in order to explain the present invention by referring to the figures.

Figure 7:
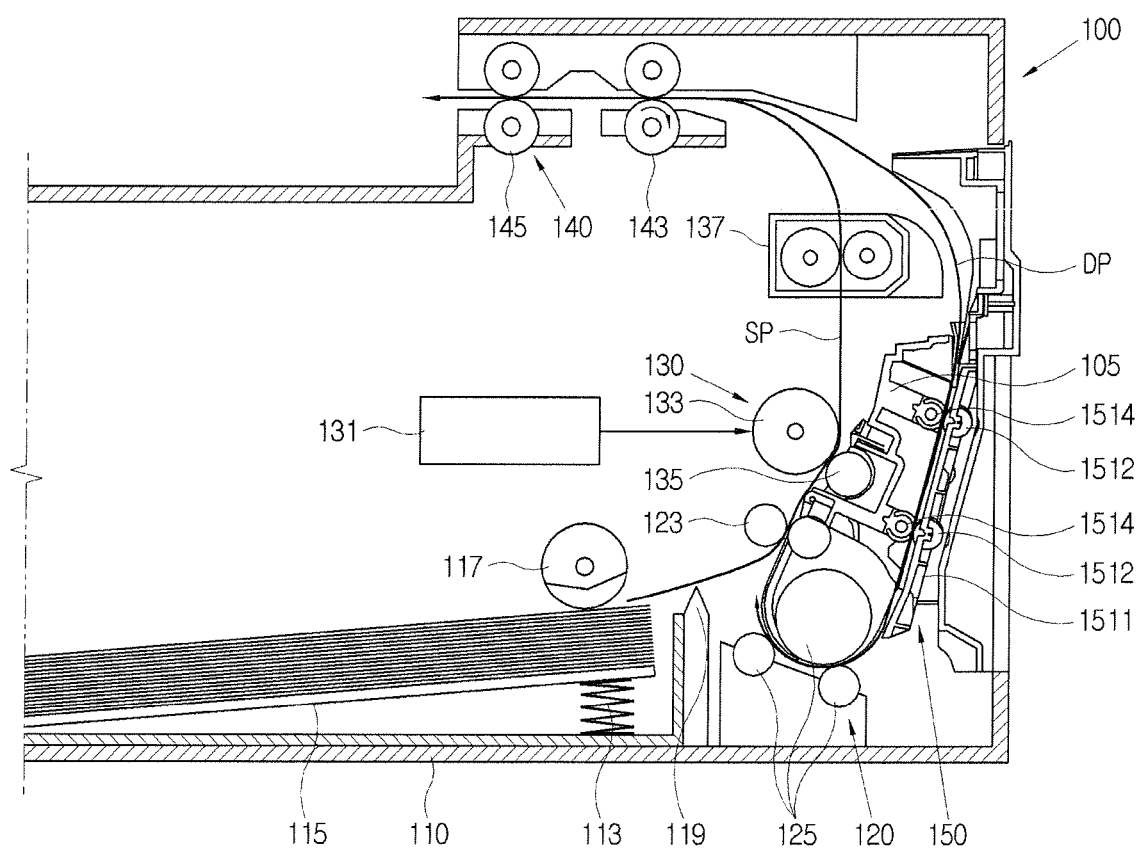
FIG. 7 is a schematic side sectional view of an image forming apparatus according to a first exemplary embodiment of the present invention.

As shown in FIG. 7, an image forming apparatus 100, according to aspects of a first exemplary embodiment of the present invention, comprises a feeding part 110, a medium transferring part 120, an image forming part 130, a reversing part 140, and a medium registration apparatus 150.

The feeding part 110 picks up papers stored on a knock up plate 115 that is elastically supported by a spring 113. The picked-up papers are separated into individual sheets, by an overlapping prevention member 119 having a frictional surface, and then transferred to registration rollers 123.

The medium transferring part 120 comprises the registration rollers 123 and single-side printing transfer rollers 125. The registration rollers 123 register a leading edge of the transferred medium into a standing state, before the registration rollers 123 contact medium transferred by a pickup roller 117. After the registration is performed, the registration rollers 123 transfer the medium toward a photosensitive drum 133 that is exposed in accordance with an exposure of an exposure unit 131.

The image forming part 130 comprises the photosensitive drum 133, the exposure unit 131 that scans a beam onto the photosensitive drum 133, a transfer roller 135, and a fixing device 137. An internal frame 105 rotatably supports the photosensitive drum 133 and the transfer roller 135. The image forming part 130 may be replaced with an inkjet-type image former comprising a printing head provided with ink jetting nozzles, or a dye sublimation-type image former comprising an ink ribbon that selectively heats and sublimates dye.

The surface of the photosensitive drum 133 is exposed by the exposure unit 131 and an electrostatic latent image, corresponding to image data, is formed. The electrostatic latent image is developed using developer and a developing roller (not shown), the developer is transcribed onto medium by the transfer roller 135, to form a toner visible image. Herein, medium refers to any printable medium, for example, paper, transparencies, and the like. The medium, on which the toner visible image is formed, passes through the fixing device 137, and the toner visible image is fixed on the medium, to thereby forming a single sided printed medium.

The reversing part 140 comprises reverse rollers 143 and discharging rollers 145. The reverse rollers 143 rotate in a forward direction to discharge the single-sided printed medium out of the image forming apparatus 100, in a single-sided printing. As shown in FIG. 7, in double-sided printing, the reverse rollers 143 rotate in a backward direction to enable the single-sided printed medium to enter the double-sided printing path DP.

Figure 8:
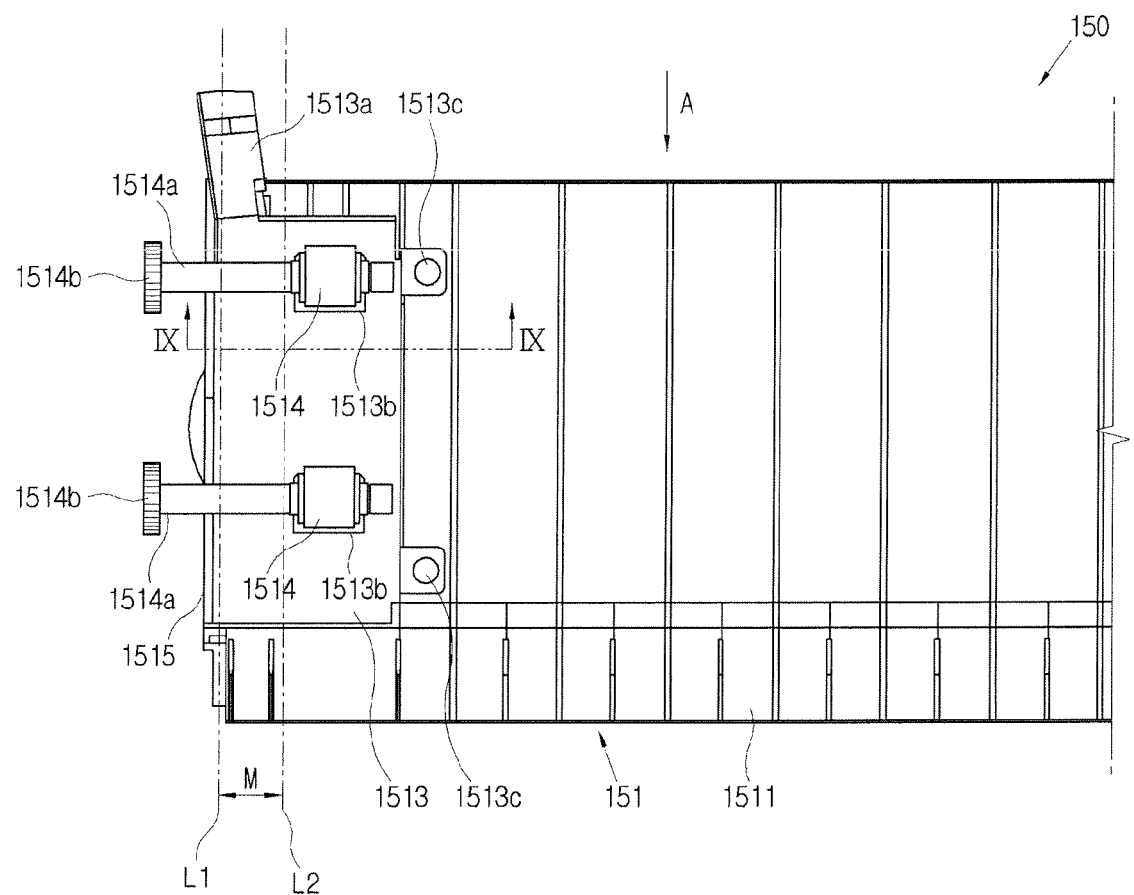
FIG. 8 is a plan view of the medium registration apparatus of FIG. 7.

The medium registration apparatus 150 enables medium that has entered the double-sided printing path DP to move toward a side guide 1515, to be side registered (see FIG. 8). The registered medium re-enters the single-side printing path SP, via the single-sided printing transfer rollers 125, and an image is formed on a second side of the medium by the image forming part 130, to produce a double-sided printed medium. The double-sided printed medium, through the above process, is discharged through the reversing part 140, to the outside of the image forming apparatus 100.

As shown in FIGS. 7 to 10, the medium registration apparatus 150, according to the first exemplary embodiment of the present invention, comprises a subassembly 151, including: a first guide plate 1511; a side guide 1515; a subassembly moving guide part 153, to support the subassembly 151, and to guide the rectilinear motion of the subassembly 151; and subassembly driving parts (subassembly drivers) 155 and 155a to drive the subassembly 151. The first guide plate 1511 guides medium, which has entered the double-side printing path DP, toward the single-sided printing transfer rollers 125.

Figure 9:
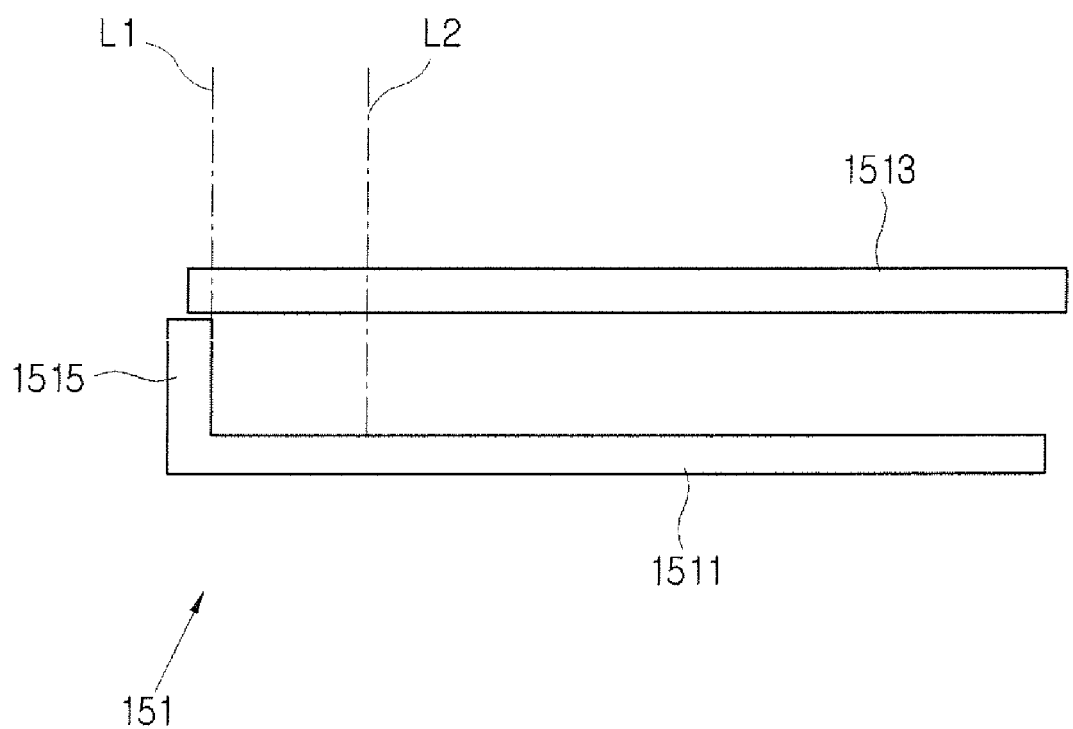
FIG. 9 is a sectional view according to a line IX-IX of FIG. 8.

As shown in FIGS. 8 and 9, the side guide 1515 is erected, along the medium transferring direction A, on the first guide plate 1511. The side guide 1515 is a side registration reference for medium that has passed through the double-sided printing path DP. The side guide 1515 is provided on the first guide plate 1511 and moves rectilinearly across the medium transferring direction A. For example, the first guide plate 1511 moves along a direction M, orthogonal to the direction A, to be disposed in medium registration reference positions L1 or L2. The first guide plate 1511 and the side guide 1515 may be formed as one unit for manufacturing efficiency. The side guide 1515 and the first guide plate 1511 can move together in an integrated fashion. The first medium registration reference position L1 denotes a position where the side guide 1515 may be disposed, so as to side register medium larger than A4 size. The second registration reference position L2 denotes a position where the side guide 1515 may be disposed, so as to side-register medium smaller than A4 size, such as B5 or A5 size. The medium registration reference positions L1 and L2 may be properly determined by experiment or experience. Also, in the present application, the medium registration reference positions are set as L1 and L2, but the medium registration reference position, of the side guide 1515, may be set according to a variety of medium sizes, such as A3, A4, B3, and B4.

Figure 10:
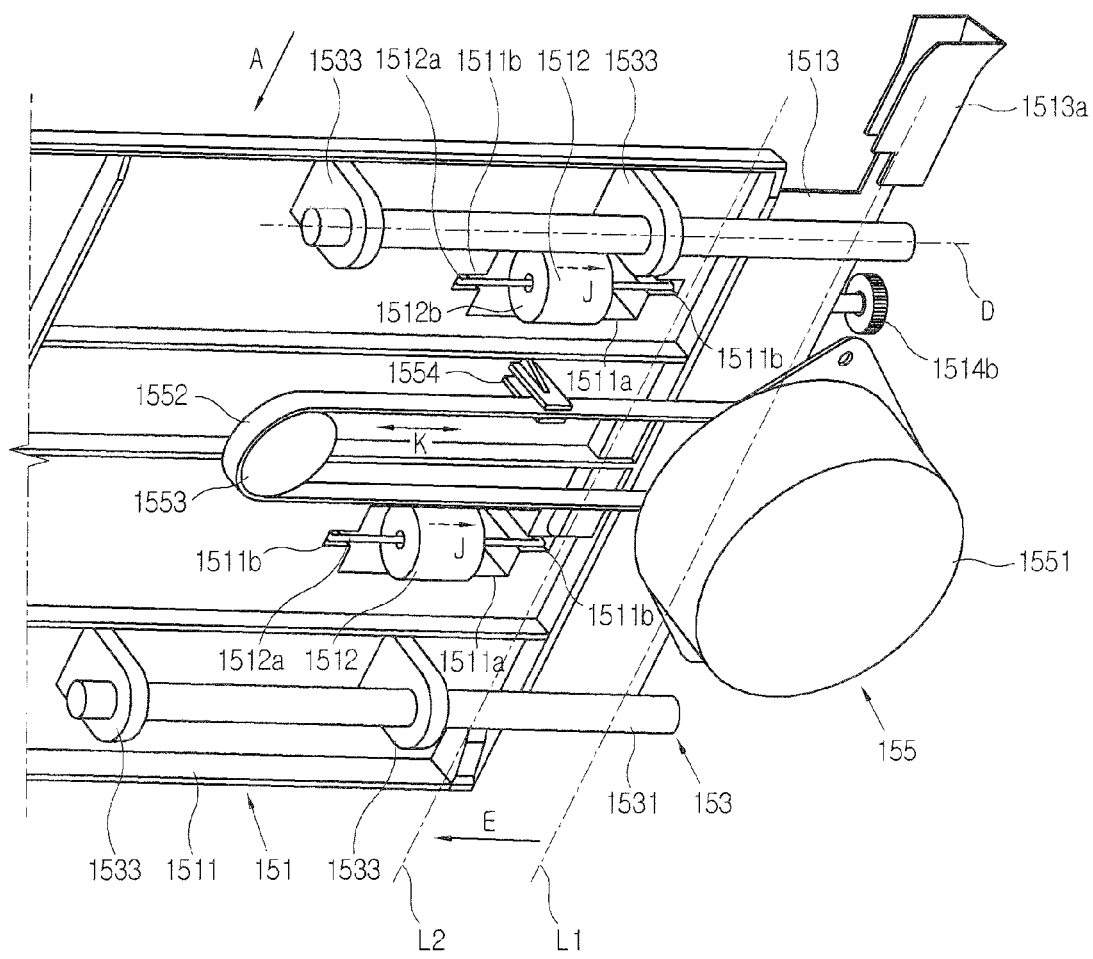
FIG. 10 is a rear perspective view of the medium registration apparatus of FIG. 8.

FIG. 10 is a rear perspective view of the first guide plate 1511 in a case where the subassembly 151 is moved to the second medium registration reference position L2. The subassembly moving guide part 153 comprises a moving guide member 1531 to guide the rectilinear movement of the first guide plate 1511. Moving guide supporting members 1533 are provided on a rear side of the first guide plate 1511 and support the first guide plate 1511, as the first guide plate 1511 moves. An end part, of the moving guide member 1531, is connected to the frame 105, of the image forming apparatus 100.

The moving guide member 1531 may be a rounded shaft or rod. The moving guide member 1531 is disposed in parallel to a direction E, the rectilinear movement direction of the subassembly 151. The moving guide member 1531 is disposed generally perpendicular to the medium transferring direction A. The moving guide member 1531 may be provided so that the subassembly 151 can reciprocate along the direction E, perpendicular to the medium transferring direction A. That is, the moving guide member 1531 is provided so that an extension line D, of the moving guide member 1531, can be perpendicular with respect to the medium transferring direction A.

Figure 11:
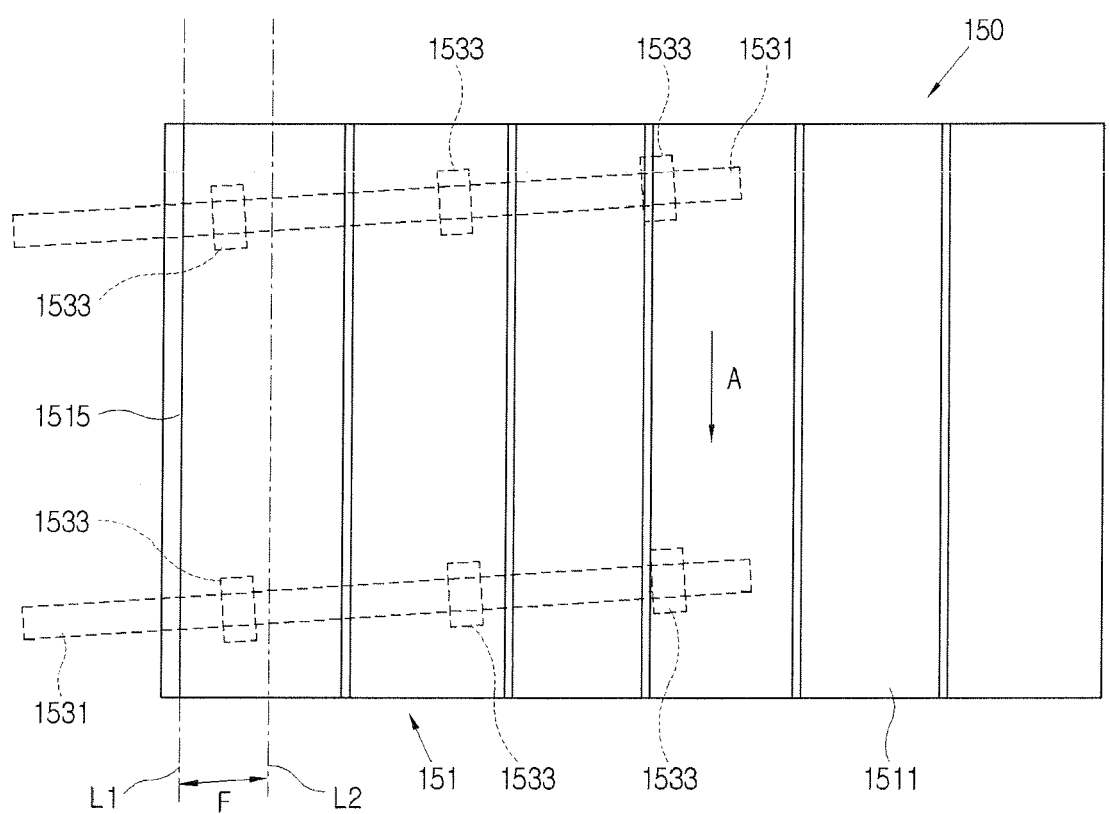
FIG. 11 is a plane view of a subassembly that moves rectilinearly in a different direction from a subassembly of the medium registration apparatus of FIG. 8.

As shown in FIG. 11, the moving guide member 1531 may be positioned so that the subassembly 151 can reciprocate along a direction F, which is not perpendicular to the medium transferring direction A, if necessary.

The moving guide supporting members 1533 support the subassembly 151, as the subassembly 151 moves along the moving guide member 1531. The moving guide supporting members 1533 may be integrated with the first guide plate 1511. As shown in FIG. 10, the moving guide supporting members 1533 may be ring-shaped, or may each have a hole defined therein. The moving guide members 1531 can be inserted into the supporting members 1533. The moving guide member 1531 and the moving guide supporting members 1533 may be lubricated to reduce friction during a relative movement therebetween.

As shown in FIG. 10, the moving guide member 1531 and the moving guide supporting members 1533 are respectively disposed on the frame 105 and the first guide plate 1511, but this arrangement can be reversed. The moving guide member 1531 and the moving guide supporting members 1533 may alternatively be a rail extending in the direction of the rectilinear movement of the subassembly 151, and a slider that moves along the rail and supports the subassembly 151. As described above, the moving guide member 1531 and the moving guide supporting members 1533 may be modified in various ways as long as the subassembly 151 can move rectilinearly along a direction generally perpendicular to the medium transferring direction A.

As shown in FIG. 10, the subassembly driving part (subassembly driver) 155 comprises a driving motor 1551, a belt 1552, and a pulley 1553. The driving motor 1551 and the pulley 1553 are fixed to the frame 105, at a position inside the image forming part 130. A shaft pulley 1551a, shown in FIG. 19, may be disposed on a rotating shaft (not shown) of the driving motor 1551. The belt 1552 is to engage the pulley 1553 with the shaft pulley 1551a, to transfer a driving force therebetween. The driving motor 1551 and the pulley 1553 may be disposed so that a line, connecting the axis of rotation of the driving motor 1551 and an axis of rotation of the pulley 1553, is be parallel with the extension line D, of the moving guide member 1531. This arrangement can limit the loss of the driving force of the driving motor 1551.

On a rear side of the first guide plate 1511 a clamper 1554 is provided to clamp the belt 1552. The clamper 1554 is fixed to the first guide plate 1511 and moves with the first guide plate 1511. The clamper 1554 may be integrated with the first guide plate 1511 for assembling efficiency.

In order to move the subassembly 151, a first side of the belt 1552 is clamped by the clamper 1554, and the driving motor 1551 is activated to move the belt 1552 in a forward or a reverse direction. The movement of the belt 1552 is transferred to the subassembly 151 through the clamper 1554 and thereby moves the subassembly 151 along a direction K. In this way, the position of the side guide 1515 is moved, to change a medium registration reference position. A sprocket and a chain may be used as alternatives to the above-described pulley 1553 and the belt 1552.

Figure 12:
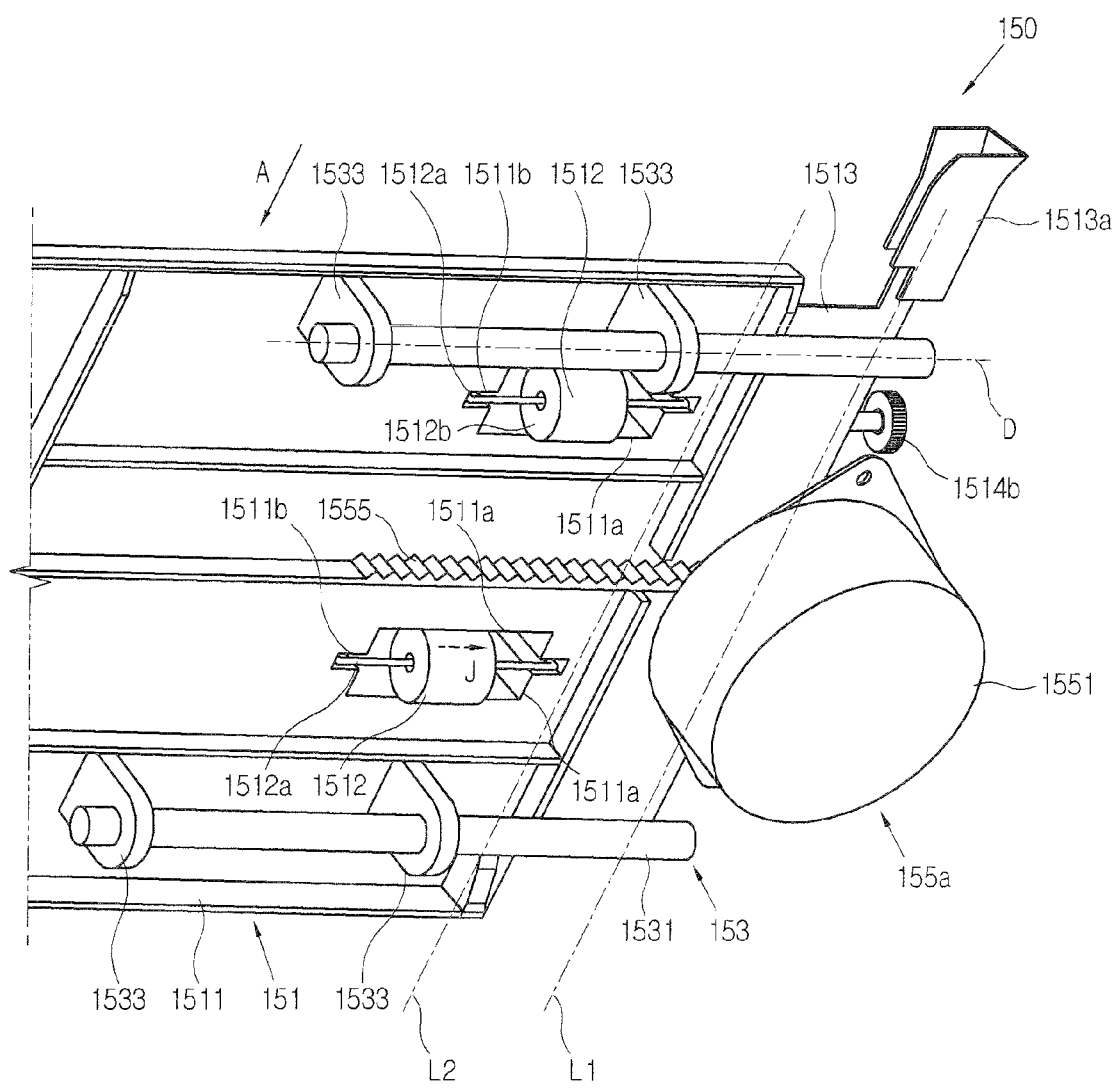
FIG. 12 is a rear perspective view illustrating a deformed example of a subassembly driving part of the medium registration apparatus of FIG. 8.

As shown in FIG. 12, the subassembly driving part (subassembly driver) 155a comprises the driving motor 1551, a pinion (not shown), and a rack 1555. The pinion is connected to the rotating shaft of the driving motor 1551, in engagement with the rack 1555. The rack 1555 is connected to a rear side of the first guide plate 1511, to be moved integrally with the first guide plate 1511. The rack 1555 may be disposed in parallel to the length of the moving guide member 1531, for efficiency. The subassembly driving parts 155, 155a may be replaced with other known components as long as the subassembly 151 can be moved rectilinearly.

As shown in FIGS. 8 and 10, the medium registration apparatus 150, according to the first exemplary embodiment of the present invention, further comprises: a second guide plate 1513; duplex rollers 1514 disposed on the second guide plate 1513, to transfer the medium toward the single-sided printing transfer roller 125; and idle rollers 1512 to contact the duplex rollers 1514 and to move askew medium toward the side guide 1515.

The second guide plate 1513 overlaps the first guide plate 1511, to prevent medium from being separated from the double-side printing path DP. In an upper part of the second guide plate 1513, may be further provided a U-shaped guide 1513a (having two bent portions) to guide medium into the subassembly 151. The internal frame 105 (see FIG. 7), is connected to the second guide plate 1513, by screws disposed in screw holes 1513c, in the second guide plate 1513. Duplex roller accommodating holes 1513b are formed in the second guide plate 1513 to allow the duplex rollers 1514 to contact medium moving along the medium transferring direction A.

The duplex rollers 1514 comprise duplex roller rotating shafts 1514a disposed above the side guide 1515. A first end of the duplex roller rotating shaft 1514a is rotatably supported by the second guide plate 1513. A second end of the duplex roller rotating shaft 1514a is coupled to a gear 1514b. The gear 1514b is connected with a main driving motor (not shown) that rotates the photosensitive drum 133 inside the image forming apparatus 100. The duplex rollers 1514 are rotated by the main driving motor. An additional driving motor to drive the duplex rollers 1514 may also be provided, as necessary. Two of the duplex rollers 1514 are shown in FIG. 8, but the number of the rollers may be changed in consideration of the size and the transferring distance of the medium passing through the double-side printing path DP.

Figure 13:
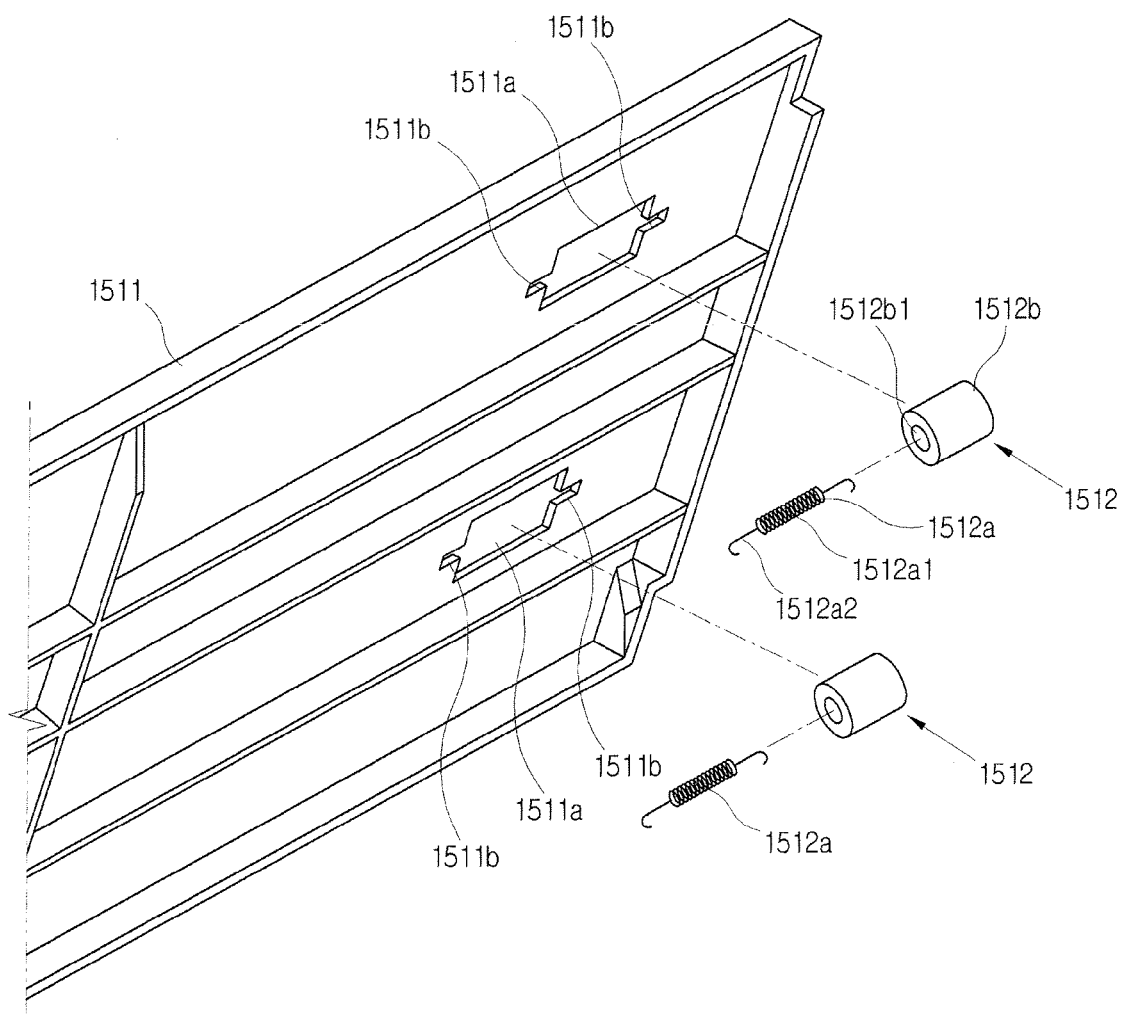
FIG. 13 is a main part perspective view illustrating an installation process for a first guide plate of idle rollers of the medium registration apparatus of FIG. 8.

As shown in FIGS. 10, 12, and 13, the idle rollers 1512 comprise idle roller rotating shafts 1512a, and rotating bodies 1512b. The idle roller rotating shafts 1512a comprise: hitching hooks 1512a2, which are hooked in hitching grooves 1511b of the first guide plate 1511; a coil spring 1512a1, which is provided between the hitching hooks 1512a2, and provides biasing force between the idle roller rotating shafts 1512a. The idle roller rotating shafts 1512a rotatably couple the idle rollers 1512 with the first guide plate 1511. The idle roller rotating shafts 1512a bias the idle rollers 1512 toward the duplex rollers 1514. The idle roller rotating shafts 1512a are offset with respect to the duplex roller rotating shafts 1514a. The angle of the offset may be about 6°. For example, the axis of rotation of the rotating bodies 1512b can be offset from the axis of rotation of the duplex roller rotating shafts 1514a. This offset can allow the idle rollers 1512 to rotate in a direction that is offset from the medium transferring direction A, such that medium, for example an askew medium, can be driven toward the side guide 1515. If the idle roller rotating shafts 1512a are disposed at an excessively offset angle, it may cause a medium jam or crumple medium. The idle roller rotating shafts 1512a can be offset by forming the hitching grooves 1511b so that an extension line connecting the hitching grooves 1511*b* can be inclined by approximately 6°, with respect to an axis of rotation of the duplex roller rotating shaft 1514*a*.

More particularly, after the idle roller rotating shafts 1512*a* are inserted into center holes 1512*b*1, of the rotating bodies 1512*b*. The hitching hooks 1512*a*2 attach to the hitching grooves 1511*b*, of the first guide plate 1511, to accomplish an offset installation in the first guide plate 1511. In addition to the above-described coupling method of the idle rollers 1512 and the first guide plate 1511, other various known methods may be used to install the idle rollers 1512 in the first guide plate 1511. For example, the offset can be a vertical offset, a horizontal offset, or a combination thereof, with respect to the axis of rotation of the duplex rollers 1514.

As shown in FIGS. 10, 12, and 13, in the first guide plate 1511 are formed the accommodating holes 1511*a* that accommodate the rotating bodies 1512*b* of the idle rollers 1512. As shown in FIG. 10, if the subassembly 151 is moved to dispose the side guide 1515 in the second medium registration reference position L2. The rotating bodies 1512*b*, of the idle rollers, 1512 are slid in a direction J, due to a frictional contact with the duplex rollers 1514, when the first guide plate 1511 is moved relative to the second guide plate 1513. For example, the first guide plate 1511 can be moved from the position L1 to the position L2. Accordingly, the rotating bodies 1512*b*, of the idle rollers 1512, can move askew medium in the double-side printing path DP toward the side guide 1515. The askew medium can be rotated by contact with the duplex rollers 1514 and the idle rollers 1512, regardless of the relative movements of the first guide plate 1511 and the second guide plate 1513. The accommodating holes 1511*a* have sufficient length to accommodate the movement of the idle rollers 1512.

Figure 14:
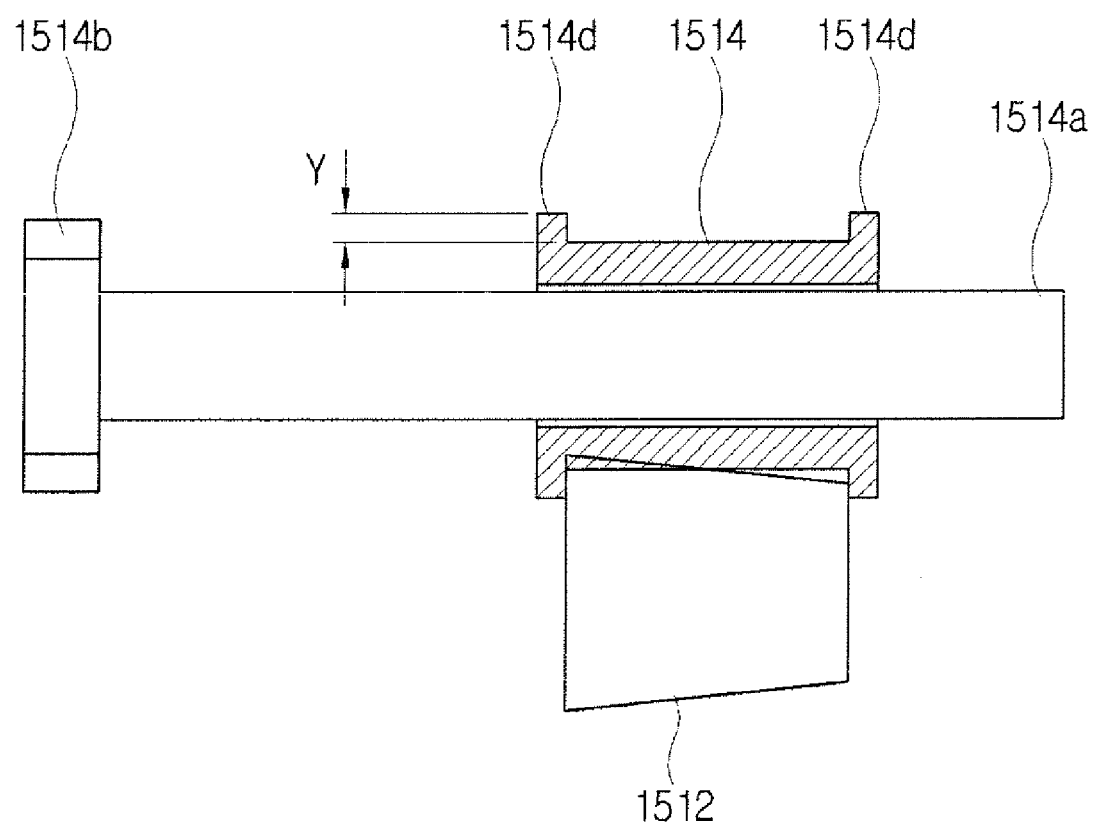
FIG. 14 is a schematic sectional view illustrating a deformed example of duplex rollers of the image forming apparatus of FIG. 7.

As shown in FIG. 14, flanges 1514*d* may be formed on opposing edges of the duplex rollers 1514, and project so that the idle rollers 1512 can be easily slid along a direction J, if the subassembly 151 is moved. The idle rollers 1512 can return to their original position when the subassembly 151 is moved back to its original position. End parts of the idle rollers 1512 are bumped to the flanges 1514*d*, to maintain contact between the idle rollers 1512 and the duplex rollers 1514 while the subassembly 151 is moved. The flanges 1514*d* are integrated with the duplex rollers 1514, and may be formed of an elastic material, for example, a rubber or a plastic. A projected height Y of the flanges 1514*d* may be set within a range such that the medium is not jammed or crumpled. The projected height Y may be minimized.

Figure 15:
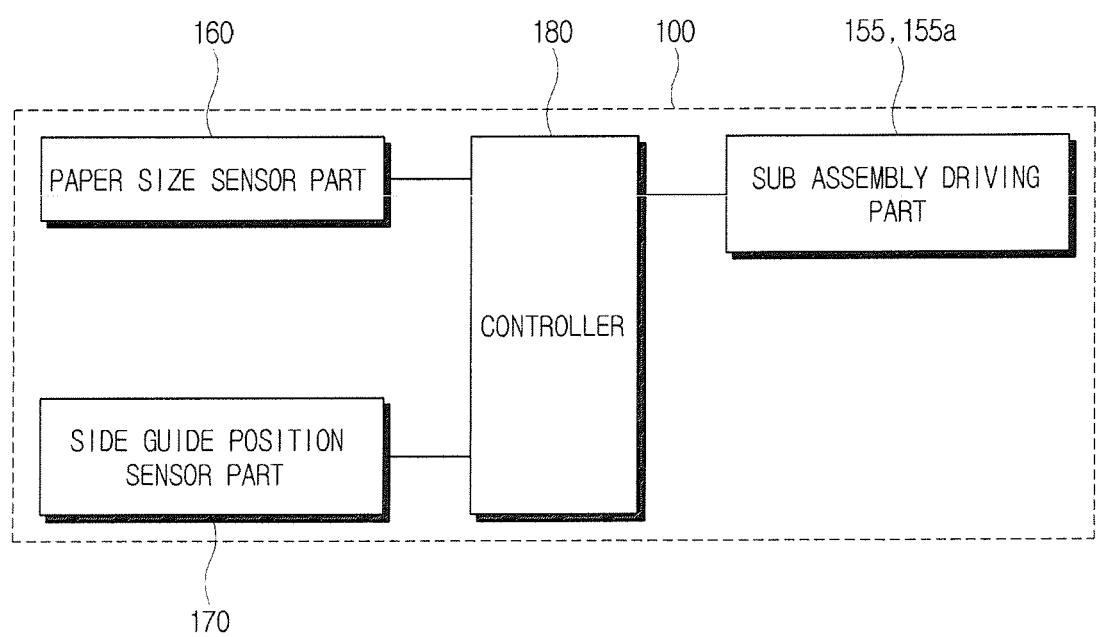
FIG. 15 is a block diagram of the image forming apparatus of FIG. 7.

As shown in FIG. 15, the image forming apparatus 100, according to the first exemplary embodiment of the present invention, may further comprise: a medium size sensor part 160 to sense the size of medium; a side guide position sensor part 170; and a controller 180 to rectilinearly move the subassembly 151 in a direction generally perpendicular to the medium transferring direction A, so that the side guide 1515 can be disposed in a predetermined medium registration reference position, according to the sensed medium.

The medium size sensor part (medium size sensor) 160 may be a printer driver installed in a host computer (not shown). If a user selects the medium size for a print application program of the host computer, the printer driver can transfer the medium size to the image forming apparatus 100. In the alternative, the medium size sensor part 160 may be any suitable medium size sensor.

The side guide position sensor part 170 senses the position of the side guide 1515. The rotating speed of the driving motor 1551, of the subassembly driving parts 155 and 155*a*, is stored, and the position of the side guide 1515 can be calculated there from. In addition, other known position sensors, such as a contact sensor or a laser sensor, may be provided. Also, the side guide position sensor part 170 may be omitted, as necessary. For example, if two medium registration reference positions, such as the first medium registration reference position L1 and the second medium registration reference position L2, are set, the side guide position sensor part 170 may be omitted. The side guide sensor part 170 can be omitted because the position of the side guide 1515 is moved to the second medium registration reference position L2, only if medium smaller than size A4 is sensed in the medium size sensor part 160, and if an initial position of the side guide 1515 is set in the first medium registration reference position L1.

The controller 180 determines whether the side guide 1515 is disposed in a predetermined medium registration reference position corresponding to the sensed medium size from medium size sensor part 160 and the side guide position sensor part 170. According to the determined result, if the side guide 1515 is not disposed in the medium registration reference position corresponding to the medium size, the driving motor 1551, of the subassembly driving parts 155 and 155*a*, is driven to dispose the side guide 1515 in the corresponding position.

If the side guide position sensor part 170 is omitted, the controller 180 determines whether the sensed medium size is greater or less than A4 size. If the initial position of the side guide 1515 is set as the first registration reference L1 and the sensed medium size is greater than A4 size, the side guide 1515 is not moved. The subassembly driving parts 155 and 155*a* are driven to dispose the side guide 1515 to the second registration reference position L2 if the medium size is determined to be less than the A4 size.

Small-sized medium can also be side-registered by moving the side guide 1515 to the medium registration reference position suitable for the small-size medium. Also, the medium transferring distance necessary for side-registering the medium passing through the double-sided printing path DP can be reduced, to thereby improve the space efficiency of the image forming apparatus 100. The controller 180 not only controls a driving state of the subassembly driving part 155 but also may control the entire printing process. The control of the entire printing process is performed according to other known methods.

As depicted in FIG. 15, the image forming apparatus 100 comprises the medium size sensor part 160, the side guide sensor part 170, and the controller 180. The components may be comprised in the medium registration apparatus 150, to be manufactured as one unit. However, the controller 180 may only control the operation of the subassembly driving part 155, on the basis of the result sensed by the medium size sensor part 160 and the side guide sensor part 170. Also, a main controller (not shown) may control the printing process other than the control of the medium registration reference apparatus 150.

Figure 16:
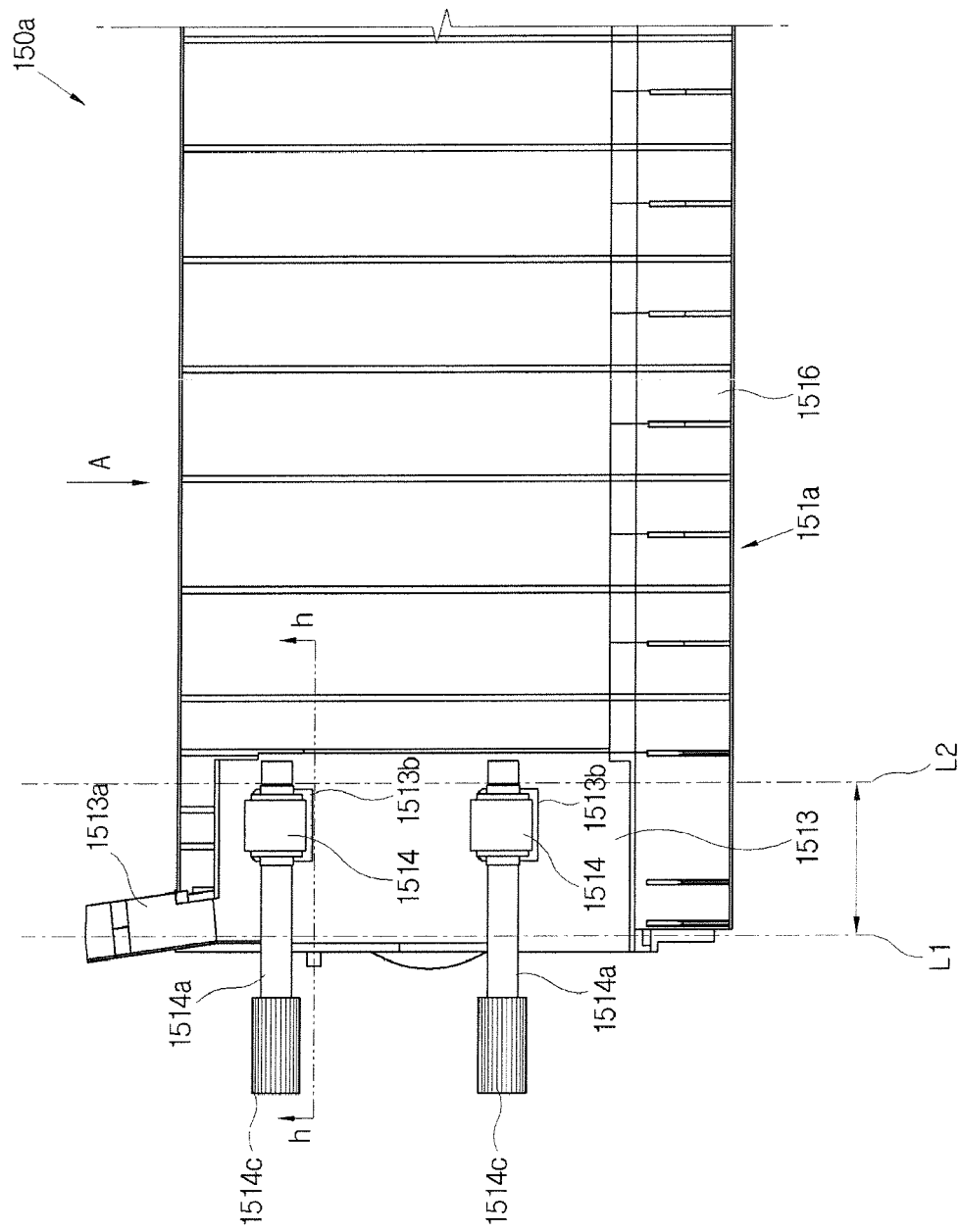
FIG. 16 is a plan view of the medium registration apparatus according to a second exemplary embodiment of the present invention.

An image forming apparatus, according to a second exemplary embodiment of the present invention, comprises the medium registration apparatus 150*a* of FIG. 16. The description of the components other than the medium registration apparatus 150*a* will be omitted, as they are the same as previously described. Like reference numerals will be assigned for the same elements as in the first exemplary embodiment.

Figure 17:
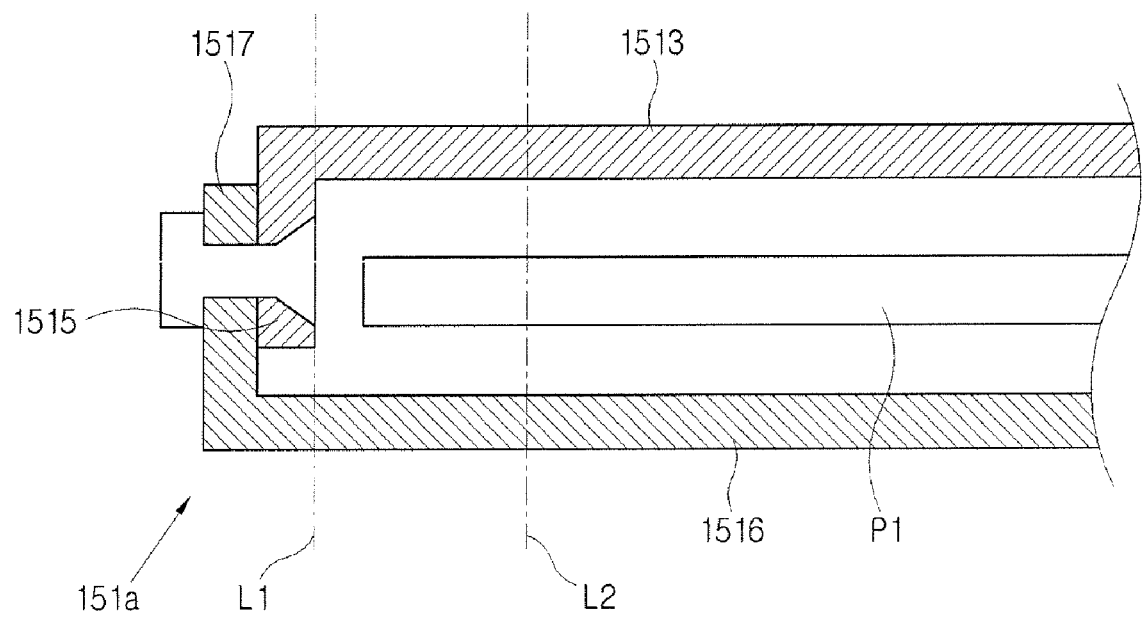
FIG. 17 is a sectional view according to a line h-h of the medium registration apparatus of FIG. 16.

FIG. 16 is a plane view illustrating the side guide 1515, of the subassembly 151*a*, disposed in the first medium registration reference position L1, and FIG. 17 is a sectional view according to a line h-h of the medium registration apparatus of FIG. 16.

Figure 18:
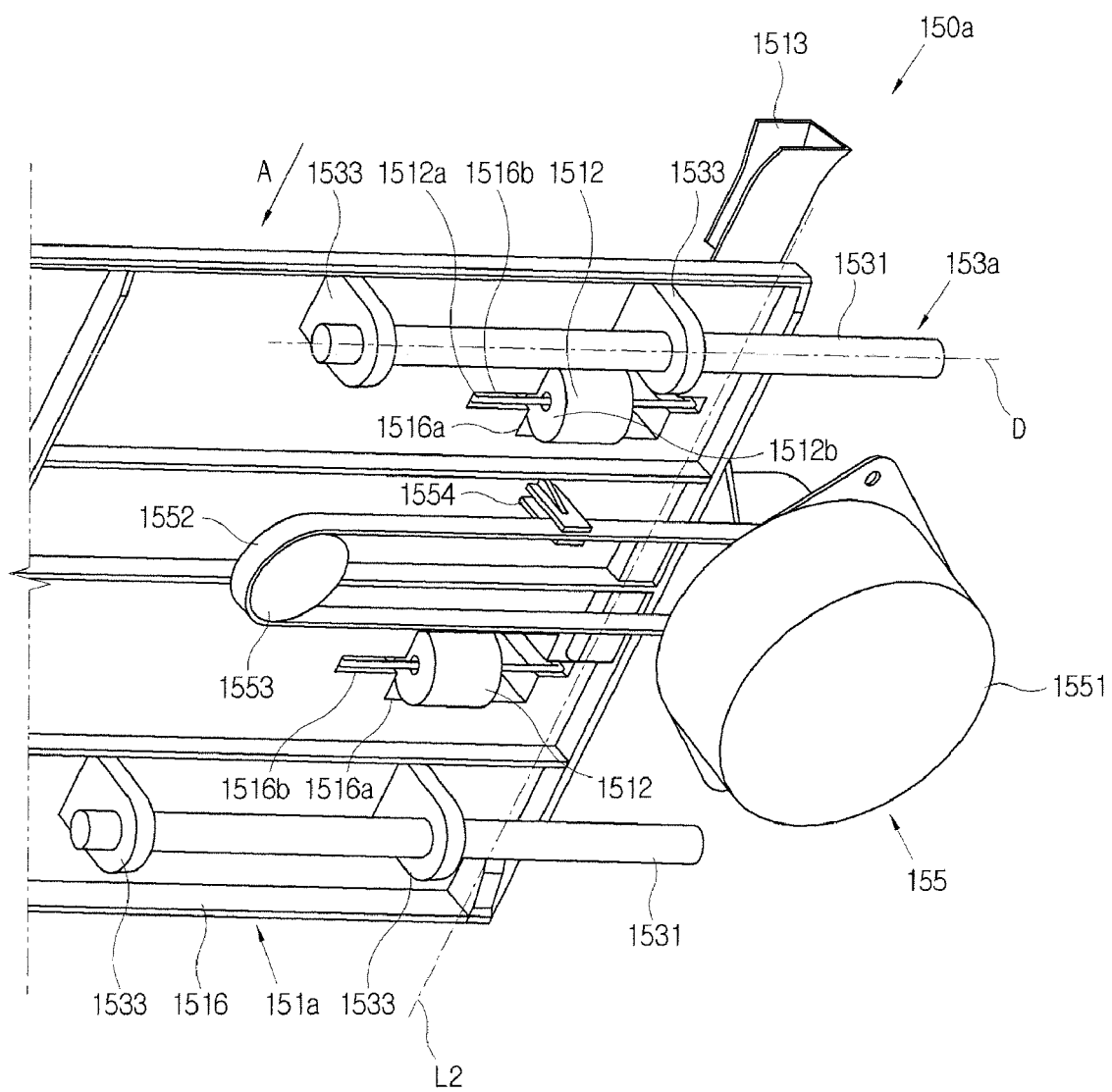
FIG. 18 is a rear perspective view of the medium registration apparatus of FIG. 16.

As shown in FIGS. 16, 17 and 18, the medium registration apparatus 150a, according to the second exemplary embodiment of the present invention, comprises: a subassembly 151a comprising a first guide plate 1516, the side guide 1515, and the second guide plate 1513; a subassembly moving guide part 153a to support the rectilinear motion of the subassembly 151a; and the subassembly driving parts 155 which drive the subassembly 151a.

Since the subassembly 151a comprises the first guide plate 1516 and the second guide plate 1513, which move as one unit, accommodating holes 1516a, to accommodate the idle rollers 1512 of the first guide plate 1516, do not need to have as long of a length to the opposite end parts of the rotating bodies 1512b, in comparison with the accommodating holes 1511a in the first exemplary embodiment. The accommodating holes 1516a may be formed as long as the accommodating holes 1511 in the first exemplary embodiment, but it is undesirable because it may allow foreign substances into the image forming apparatus 100. Hitching grooves 1516b, of the first guide plate 1516, are the same as the hitching grooves 1511b in the first exemplary embodiment.

A bent member 1517 is coupled to an edge on one side of the first guide plate 1516, along the medium transferring direction A. As shown in FIG. 17, the bent member 1517 and the first guide plate 1516 may be integrated together. The side guide 1515 is provided on the first guide plate 1516, along the medium transferring direction A. The side guide 1515 and the second guide plate 1513 may be integrated together. Also, contrary to FIG. 7, the side guide 1515 and the bent member 1517 may be provided on the second guide plate 1513 and the first guide plate 1516, respectively.

The first guide plate 1516 and the second guide plate 1513 face each other and become a moving passage for a medium P1 that passes through the double-side printing path DP (shown in FIG. 7). The bent member 1517 and the side guide 1515 face each other and are coupled by a coupler. Accordingly, the first guide plate 1516, the second guide plate 1513, and the side guide 1515 may be integrally moved with the subassembly 151a. Since the second guide plate 1513 moves integrally with the first guide plate 1516, it cannot be fixed to the frame 105, as shown in the first exemplary embodiment.

As shown in FIG. 18, the subassembly 151a is movably supported by the subassembly moving guide part 153a. The subassembly moving guide part 153a comprises: moving guide members 1531, which extend along the rectilinear movement direction of the subassembly 151a, to guide the movement of the subassembly 151a; and moving guide supporting members 1533, which are provided on a rear side of the first guide plate 1516, to support the first guide plate 1516.

Since the subassembly 151a comprises the first and second guide plates 1516 1513, the moving guide members 1531 may be provided on the second guide plate 1513, instead of the first guide plate 1516. The moving guide members 1531 may be provided in both the first guide plate 1516 and the second guide plate 1513, as necessary. The position of the moving guide supporting members 1533 is changed according to the position of moving guide members 1531. However, the subassembly moving guide part 153a is properly disposed not to interfere with the other parts inside the image forming apparatus, when the subassembly 151a moves.

The subassembly moving guide part 153a is the same as the subassembly moving guide part 153, according to the first exemplary embodiment, except that the positions of the moving guide members 1531 and the moving guide supporting members 1533 can be changed.

Figure 19:
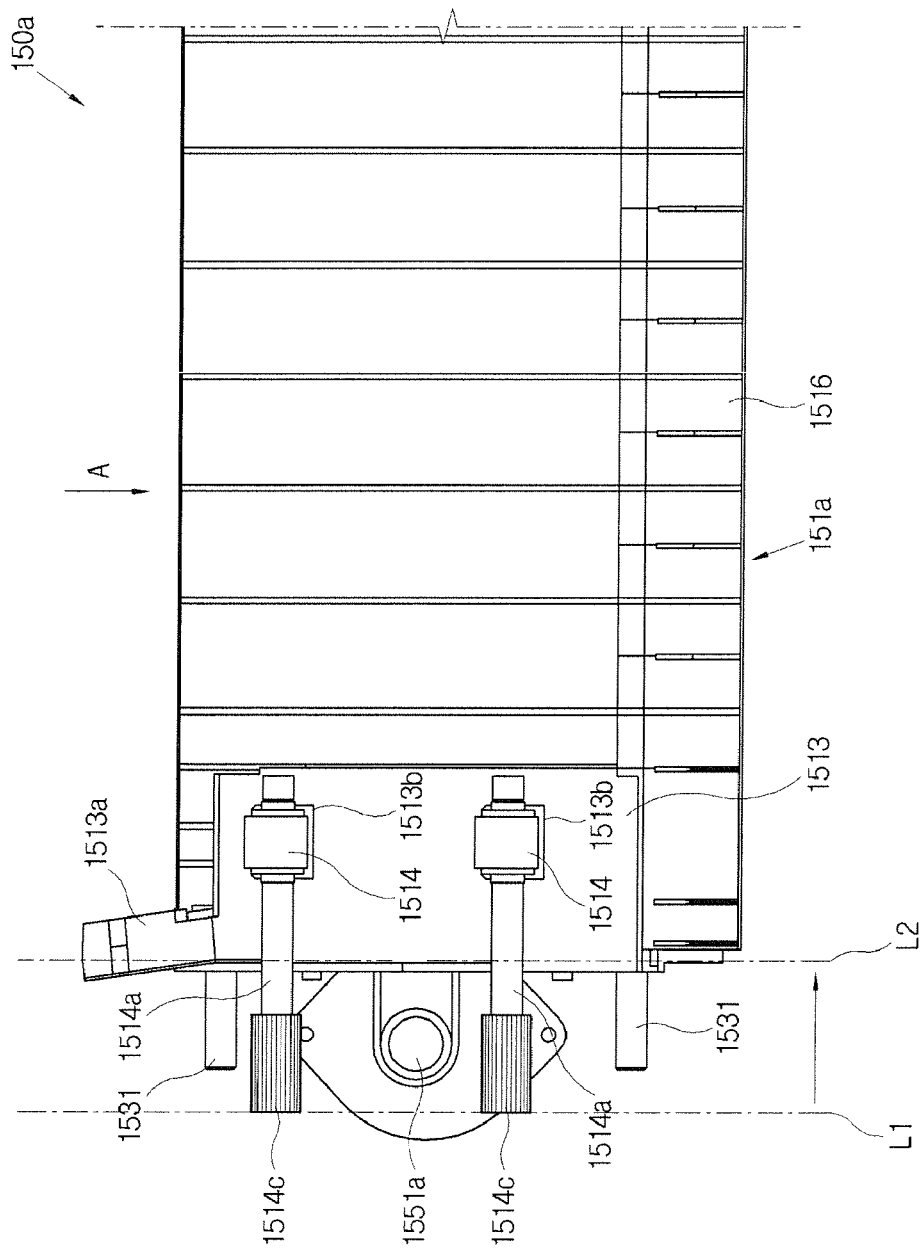
FIG. 19 is a plan view illustrating a moved side guide of the medium registration apparatus of FIG. 16.

FIG. 19 is a plane view illustrating when the side guide 1515 is moved from the first medium registration reference position L1 to the second medium registration reference position L2.

As shown in FIGS. 16 to 19, the medium registration apparatus 150a, according to the second exemplary embodiment of the present invention, may further comprise: duplex rollers 1514, which are installed in the second guide plate 1513, to transfer medium toward the single-sided printing transfer roller 125; and the idle rollers 1512, which are installed in the first guide plate 1516 to contact with the duplex rollers 1514, to move the askew medium toward the side guide 1515. The duplex rollers 1514 are disposed to move integrally with the subassembly 151a.

In the first exemplary embodiment, in an opposite end part, of the duplex roller rotating shafts 1514a, is installed a gear 1514b, but in the second exemplary embodiment, in the opposite end part, of the duplex roller rotating shafts 1514a, is installed a transmission gear 1514c. The transmission gear 1514c has a row of teeth extending radially from the duplex roller rotating shaft 1514a, as shown in FIG. 19.

The length of the row of teeth of the transmission gear 1514c is based on amount of movement needed from the duplex rollers 1514. Accordingly, even when the duplex rollers 1514 move with the second guide plate 1513, along the moving guide members 1531, the duplex rollers 1514 can continually receive power from the main driving motor (not shown), through the transmission gear 1514c. An additional motor only for the duplex rollers 1514 may be provided and moved with the duplex rollers 1514, as necessary. Unlike FIG. 19, the duplex rollers 1514 and the idle rollers 1512 may be installed on the first guide plate 1516 and the second guide plate 1513, respectively.

As described above, the image forming apparatus and the medium registration apparatus, according to aspects of the present invention, has an effect as follows: first, a small-sized medium can be side-registered; and second, a medium transferring distance, necessary for side-registrating medium passing through the double-side printing path, can be reduced, thereby improving internal space efficiency and obtaining a compact size.

Although a few embodiments of the present invention have been shown and described, it will be appreciated by those skilled in the art that changes may be made in this embodiment without departing from the principles and spirit of the invention, the scope of which is defined in the claims and their equivalents.

What is claimed is:
1. An image forming apparatus, comprising:
an image forming part to form an image on a medium, thereby forming a printed medium;
a subassembly comprising:
a first guide plate to support the printed medium and to guide the printed medium to the image forming part;
at least one printed medium mover disposed in the first guide plate; and
a side guide disposed adjacent to an edge of the first guide plate and along a transferring direction of the printed medium, to align a side of the printed medium;
a subassembly moving guide to support the subassembly, and to guide the subassembly along a first direction crossing to the medium transferring direction; and
a subassembly driver to move the subassembly along the first direction.

2. The image forming apparatus according to claim 1, wherein the subassembly oscillates along the first direction, and the first direction is perpendicular to the transferring direction.

3. The image forming apparatus according to claim 1, wherein the side guide and the first guide plate are integrally formed.

4. The image forming apparatus according to claim 1, further comprising:
a medium size sensor to sense a size of the medium; and
a controller to control movement of the subassembly such that the side guide is moved to a side registration reference position based on the medium size sensed by the medium size sensor.

5. The image forming apparatus according to claim 1, further comprising:
a second guide plate overlapping the first guide plate,
at least one medium mover is disposed on the second guide plate, to move askew medium toward the side guide, in a direction offset from the transferring direction.

6. The image forming apparatus according to claim 5, wherein the second guide plate is coupled to the first guide plate and moves integrally with the subassembly.

7. The image forming apparatus according to claim 5, further comprising:
a medium size sensor to sense a size of the medium; and
a controller to control movement of the subassembly such that the side guide is moveable to a side registration reference position based on the medium size sensed by the medium size sensor.

8. The image forming apparatus according to claim 7, further comprising a frame disposed inside the image forming apparatus, wherein the subassembly moving guide further comprises a moving guide member attached to the frame and a moving guide supporting member attached to the first guide plate, wherein the moving guide member guides the moving guide supporting member as the subassembly moves along the first direction.

9. The image forming apparatus according to claim 8, wherein:
the moving guide supporting member has a hole; and
the moving guide member is rod-shaped and extends through the hole of the moving guide supporting member, in a direction parallel to the first direction.

10. The image forming apparatus according to claim 1, wherein the subassembly driver comprises:
a driving motor;
a pulley disposed on the first guide plate;
a belt that connects the pulley with the driving motor; and
a clamper disposed on the first guide plate, to clamp the belt,
wherein the driving motor moves the belt, to move the clamper, to move the subassembly along the first direction.

11. The image forming apparatus according to claim 1 wherein the subassembly driver comprises:
a driving motor;
a pinion that is rotated by the driving motor; and
a rack disposed on the first guide plate,
wherein the driving motor rotates the pinion, to move the rack, to move the subassembly along the first direction.

12. A medium registration apparatus for an image forming apparatus, comprising:
a subassembly comprising:
a first guide plate to support medium as the medium is moved along a medium transferring direction;
at least one medium mover disposed in the first guide plate; and
a side guide disposed adjacent to an edge of the first guide plate, in parallel with the medium transferring direction, and is to align the medium disposed on the first guide plate;
a subassembly moving guide to support the subassembly and guide the subassembly in a first direction crossing the medium transferring direction; and
a subassembly driver to move the subassembly along the first direction.

13. The medium registration apparatus according to claim 12, wherein the subassembly oscillates along the first direction, and the first direction is perpendicular to the medium transferring direction.

14. The medium registration apparatus according to claim 12, wherein the side guide is integrated with the first guide plate.

15. The medium registration apparatus according to claim 12, further comprising:
a second guide plate that overlaps the first guide plate,
at least one medium mover is disposed on the second guide plate, to move the medium toward the side guide.

16. The medium registration apparatus according to claim 15, wherein the second guide plate is coupled to the first guide plate and moves integrally with the subassembly.

17. The medium registration apparatus according to claim 15, further comprising:
a medium size sensor to sense a size of the medium; and
a controller to controls the subassembly driver to move the subassembly so that the side guide is disposed at a side registration reference position corresponding to the medium size sensed by the medium size sensor.

18. The medium registration apparatus according to claim 17, disposed within an image forming apparatus comprising:
wherein the subassembly moving guide further comprises a moving guide member attached to a frame disposed inside the image forming apparatus and a moving guide supporting member attached to the first guide plate, wherein the moving guide member guides the moving guide supporting member as the subassembly moves along the first direction.

19. The medium registration apparatus according to claim 18, wherein:
the moving guide supporting member has a hole; and
the moving guide member is rod-shaped and extends through the hole of the moving guide supporting member, in a direction parallel to the first direction.

20. The medium registration apparatus according to claim 15, further comprising:
the at least one medium mover disposed in a groove in the first guide plate; and
the at least one medium mover disposed in a groove in the second guide plate,
wherein the at least one medium mover disposed in a groove in the first guide plate and the at least one medium mover disposed in a groove in the second guide plate are disposed adjacent to each other.

21. The medium registration apparatus according to claim 20, wherein
the second medium mover has an axis of rotation that is perpendicular to the medium transfer direction,
the first medium mover has an axis of rotation that is offset from the medium transfer direction, and
the first and second medium movers are to move a skewed medium toward the side guide, in a direction that is offset from the medium transfer direction.

22. The medium registration apparatus according to claim 21, wherein the offset of the axis of rotation of the first medium mover is less than about 6°.

23. The medium registration apparatus according to claim 20, wherein the first medium mover is a duplex roller comprising a shaft, a roller disposed on a first end of the shaft, and a transmission gear disposed on a second end of the shaft.

24. The medium registration apparatus according to claim 20, wherein the first medium mover comprises at least two idle rollers and the second medium mover comprises at lest two duplex rollers.

25. The medium registration apparatus according to claim 20, wherein the second medium mover is an idle roller that moves laterally to maintain contact with the first medium mover when the first medium mover is moved along the first direction.

26. The medium registration apparatus according to claim 20, wherein the first medium mover is a duplex roller comprising a roller portion, wherein the roller portion comprises flanges to guide the second medium mover when the first medium mover is moved along the first direction.

27. The medium registration apparatus according to claim 12, wherein the subassembly driver comprises:
a driving motor;
a pulley disposed on the first guide plate;
a belt that connects the pulley with the driving motor; and
a clamper disposed on the first guide plate, to clamp the belt,
wherein the driving motor moves the belt, to move the clamper, to move the subassembly along the first direction.

28. The medium registration apparatus according to claim 12, wherein the subassembly driver comprises:
a driving motor;
a pinion that is rotated by the driving motor; and
a rack that is attached to the first plate,
wherein the driving motor rotates the pinion, to move the rack, to move the subassembly along the first direction.

* * * * *

UNITED STATES PATENT AND TRADEMARK OFFICE
CERTIFICATE OF CORRECTION

PATENT NO. : 8,342,520 B2
APPLICATION NO. : 11/755287
DATED : January 1, 2013
INVENTOR(S) : Jun-tae Kim It is certified that error appears in the above-identified patent and that said Letters Patent is hereby corrected as shown below:

In the Claims:

Column 15, Line 10, In Claim 24, delete "lest" and insert -- least --, therefor.

Signed and Sealed this
Seventh Day of May, 2013

Teresa Stanek Rea
*Acting Director of the United States Patent and Trademark Office*